June 20, 1950     H. F. MAYNES     2,512,357
FISHING REEL

Filed Jan. 30, 1947     2 Sheets-Sheet 1

INVENTOR
HYLA F. MAYNES,
BY
Bean, Brooks, Buckley & Bean.
ATTORNEYS

June 20, 1950 H. F. MAYNES 2,512,357
FISHING REEL
Filed Jan. 30, 1947 2 Sheets-Sheet 2
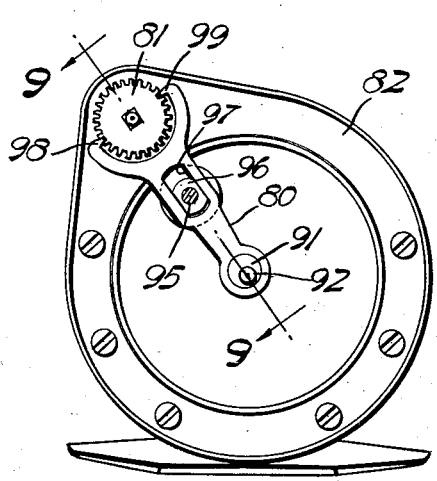
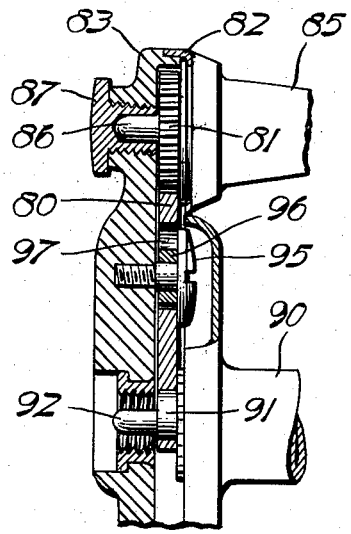
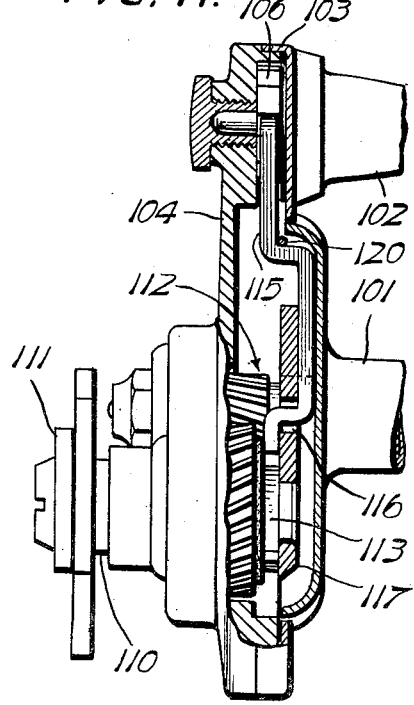
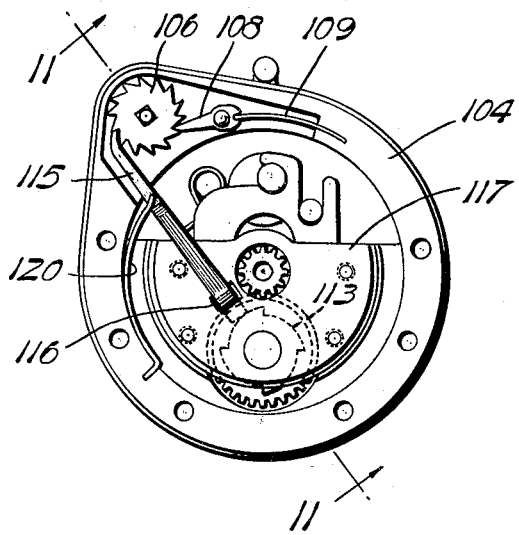
INVENTOR.
HYLA F. MAYNES,
BY
Bean, Brooks, Buckley & Bean.
ATTORNEYS.

Patented June 20, 1950

2,512,357

UNITED STATES PATENT OFFICE 2,512,357

FISHING REEL

Hyla F. Maynes, Miami, Fla.; Emma C. Maynes, executrix of said Hyla F. Maynes, deceased Application January 30, 1947, Serial No. 725,324

2 Claims. (Cl. 242—84.4)

This invention relates to fishing reels and particularly to means for feeding fishing line evenly onto the winding spools thereof.

My prior Patent No. 1,973,686 dated September 11, 1934, discloses a level wind means wherein a shaft is spaced parallel to the winding spool and formed with a generally helical groove, so that oscillation of the shaft at a relatively slow rate compared to the rate of rotation of the spool presents a shifting valley-like contour which guides the line back and forth across the spool during winding.

According to the construction shown in the aforesaid Letters Patent, the level wind shaft must change its direction of rotation each time the line reaches one side of the spool, in order to lay the line back across the spool toward the other side. The level wind shaft must therefore oscillate in timed relation with the winding spool and accordingly transmission means of some complexity must be provided for translating the continuously rotative movement of the winding spool to a reversely rotative or oscillatory movement of the level wind shaft.

My present invention contemplates an improved level wind shaft construction wherein the level wind shaft element is of such nature that it produces the desired to and fro distribution of the line on the spool by mere continuous rotation of the level wind shaft in either direction. The simplification which this innovation introduces in the construction of a level wind fishing reel is believed to be obvious. The necessity for mechanism to translate rotative to oscillatory or alternating rotative movement is entirely dispensed with and the level wind shaft may be connected with the winding spool by a simple train of spur gears, proportioned merely to provide the desired reduction in ratio from the spool to the level wind shaft. Alternatively, and as shown in several embodiments herein, even simpler means may be availed of for producing the relatively slow continuous rotation of the level wind shaft.

A further advantage of the construction of the present invention is that no precaution or auxiliary mechanism need be provided for insuring that the level wind shaft oscillations occur in proper phase relationship with respect to the position of the helical formation therein. Also, since all transmission means, save simple speed reducing gearing, is dispensed with, the possibility of jamming, which is inherent in practically all direction reversing mechanisms, is obviated.

Other objects and advantages of the present invention will be apparent to those skilled in the art from a perusal of the following description of a complete embodiment of the invention and a consideration of the accompanying drawings. It is to be understood, however, that the example set forth herein and in the drawings is by way of illustration only and the spirit and scope of the present invention are limited only as defined in the appended claims.

In the drawings:

Fig. 8 is a view similar to Fig. 2 showing a modified form of level wind shaft drive;

Fig. 9 is a fragmentary enlarged cross-sectional view on the line 9—9 of Fig. 8;

Fig. 10 is a view similar to Fig. 2 showing another modified form of level wind shaft drive; and Fig. 11 is an enlarged fragmentary cross-sectional view on the line 11—11 of Fig. 10.

Throughout the several figures of the drawings like characters of reference denote like parts and the reel shown in detail in Figs. 1 through 7 by way of example comprises outwardly opening cup-shaped end members 21 and 22 provided, respectively, with cover elements 23 and 24 for seating over the cup-shaped end members to provide opposite side chambers for purposes which will presently appear. The end members 21 and 22 are rigidly connected by a number of transverse columns or pillars 25. A saddle 26 for securement to a fishing rod may be connected rigidly to one or more of the pillars 25 in conventional manner.

Figure 4:
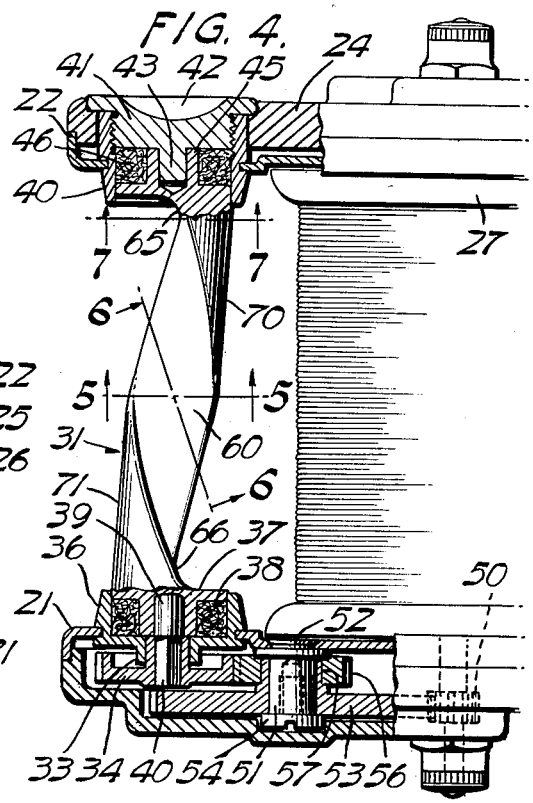
Fig. 4 is a fragmentary cross-sectional view taken on the line 4—4 of Fig. 2 but on an enlarged scale and with portions shown in elevation.

The reel includes a flanged line winding spool 27 journaled in the frame in any desired manner and adapted to be rotated by means of a turning handle or crank 28 to which it is connected by suitable gearing (not shown) in the chamber between end member 22 and end cover element 24. Disposed between and journaled generally in the end members 21 and 22 is a level wind shaft 31 which, in the illustrated form, comprises a fundamentally cylindrical body having helical formations which will later be described in detail. End member 21 has fixed therein a bearing element 33 which rotatably supports a final drive pinion 34 as shown in Fig. 4. Bearing element 33 includes an inwardly directed annular flange 36 which cooperates with a retaining element 37 to provide a chamber for receiving a packing washer 38 of felt or the like. At this end of level wind shaft 31, there is a reduced journal portion 39 which bears in retaining element 37 and terminates in a squared portion 40 which fits in a complementary square opening in pinion 34 to effect driving connection therewith.

The opposite end wall 22 of the reel has fixed therein a sleeve 40 which is internally threaded at its outer end to receive a bearing nut 41 as shown in Fig. 4. Bearing nut 41 is provided with a slot 42 which may be engaged by a coin or the like so that bearing nut 41 may be readily disassembled. At its inner end bearing nut 41 has a pintle portion 43 and the adjacent end of level wind shaft 31 has an annular bearing formation 45 which is disposed about pintle portion 43 for rotative bearing thereon. The adjacent radial face of the level wind shaft proper and the outer periphery of the annular formation 45 cooperate with the interior of sleeve 40 and the adjacent face of nut 41 to provide a chamber for receiving packing which may comprise a felt washer as at 46 in Fig. 4.

Winding spool 27 has fixed thereto, between end member 21 and its associated cover element 23, a drive pinion 50. Intermediate gearing between drive pinion 50 and final drive gear 34 is supported upon a stud 51 which may be fixed to end member 21 by riveting or the like as at 52 in Fig. 4. A gear 53 which meshes with pinion 50 has rotative bearing on pin 51 and is retained against axial displacement by means of a screw 54 which is threaded into the outer end of pin 51.

An intermediate drive pinion 56 is shown in Fig. 4 as being assembled over a hub portion 57 of gear 53. The hub portion 57 of gear 53 and a central opening of intermediate pinion 56 may be splined, keyed, or provided with other complementary non-circular formations so that they rotate as a unit on bearing pin 51. Intermediate pinion 56 meshes with final drive pinion 34 so that winding rotation of spool 27 produces continuous unidirectional rotation of level wind shaft 31 in a fixed predetermined ratio.

Figure 5:
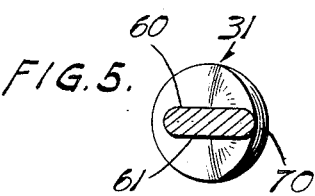
Fig. 5 is a cross-sectional view on the line 5—5 of Fig. 4.

The cross-section of level wind shaft 31 at its mid point is illustrated in Fig. 5 and as there shown includes a pair of flat surfaces 60 and 61. Each of these flat surfaces forms the generatrix of a helix which is generated at such rate as to move about the level wind shaft a distance of about 180° in the length of the useful part of the level wind shaft 31. The helixes generated by flat surfaces 60 and 61 are in opposite directions so that flat surfaces 60 and 61, working outwardly from the mid point of the level wind shaft 31 in either direction, intersect and finally merge in slightly convex surfaces 65 and 66 at either end of the useful length of level wind shaft 31.

The remainder of the surface of level wind shaft 31 is arcuate in transverse cross-section, concentric with the axis of the shaft, and tapering inwardly from the ends about four degrees. The two arcuate tapered portions are designated 70 and 71 in the drawings. The manner in which the surfaces 60 and 61 merge helically in opposite directions produces the relatively long, flat, oval cross-section shown in Fig. 6.

When a winding operation begins with the line in such position that it is in contact with one of the tapered surfaces 70 or 71 the taper causes the line to move toward the center of the spool until it is picked up by one of the flat surfaces 60 or 61 for continued movement across the spool. This will not normally happen in the modification of Figs. 1 through 9 where the level wind shaft is geared directly to the spool but is likely to happen in the modification of Figs. 10 and 11 where conventional means are provided for optional free rotation of the spool.

Figure 1:
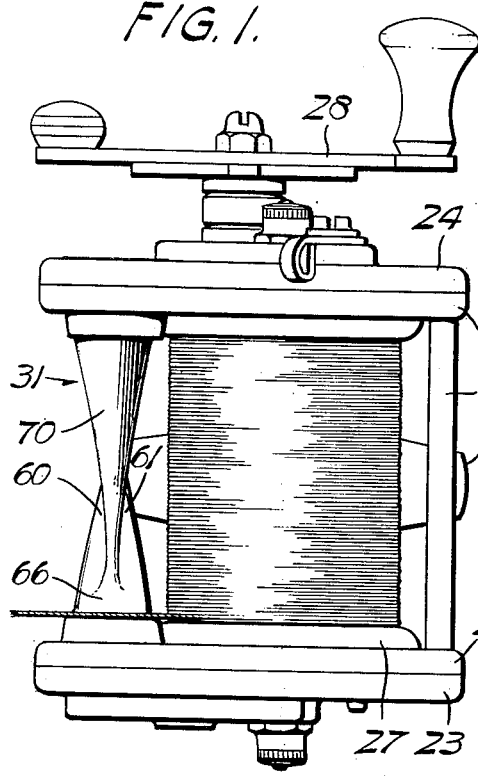
Fig. 1 is a plan view of a surf-casting type of reel.

The level wind shaft 31 is not shown in the same relative position in Fig. 4 as it is in Fig. 1. The cross-section, Fig. 4, is taken obliquely, as indicated in Fig. 2, and therefore, for clearness of illustration, the level wind shaft is shown in Fig. 4 rotated to a position where it is at right angles to the position in which it is illustrated in Fig. 1.

Having the foregoing in mind, if a line from spool 27 were drawn across level wind shaft 31 in the position in which it is shown in Fig. 1, the line will gravitate and be guided to the position in which it is shown in Fig. 1 at the lower end of the level wind shaft as viewed in Fig. 1. If, then, shaft 31 be rotated in either direction, the line will be guided uniformly toward the other end of the spool, since it will tend to rest in the valley formed by whichever of the flat helical surfaces 60 or 61 it is in contact with, since such flat helical surface forms a moving valley which moves across the reel to the opposite end, the upper end as viewed in Fig. 1, as shaft 31 is rotated.

Thereupon continued rotation of the level wind shaft 31 in the same direction guides the line uniformly back across the reel by engagement thereof in the valley formed now by the other of the two flat surfaces 60 and 61. The line is thus guided to and fro across the reel and is wound level on spool 27 by mere continuous rotation of level wind shaft 31 at a timed rate with respect to the rate of rotation of spool 27.

Figures 2, 6:
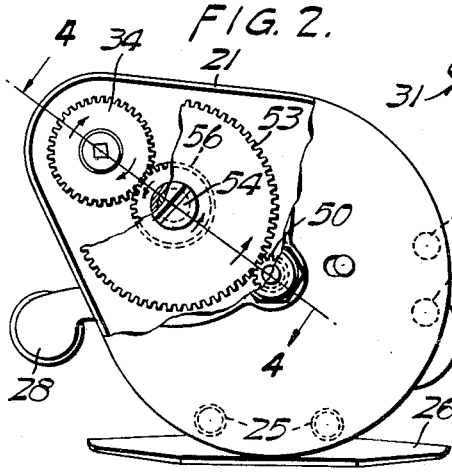
Fig. 2 is a side elevational view thereof with portions of the outer casing broken away for added illustration.
Fig. 6 is a cross-sectional view on the line 6—6 of Fig. 4.
Figure 3:
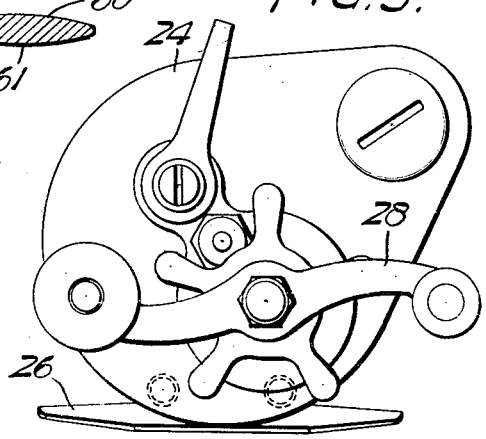
Fig. 3 is a side elevational view of the opposite side of the reel from Fig. 2.
Figure 7:
Fig. 7 is a cross-sectional view on the line 7—7 of Fig. 4.

While the level wind shaft 31 is shown to be solid in Figs. 5, 6 and 7, it is within the contemplation of the present invention to form the same as a hollow member, to attain minimum weight. Since no considerable loads are applied to the level wind shaft it may comprise a relatively thin walled hollow member of any desired material.

Various other means for rotating the level wind shaft may be employed. A simple arrangement is shown in Figs. 8 and 9 wherein the spur gear train of the first-described embodiment is replaced by a driving arm 80 acting upon a pinion 81 which may be fixed for rotation with the level wind shaft as in the previous embodiment. In this embodiment an end member 82 corresponds to end member 21 of the previous embodiment and a cover element therefor is designated 83. The level wind shaft of the present embodiment is indicated fragmentarily at 85 in Fig. 9 and is the same as level wind shaft 31 as far as its line guiding formation is concerned. Level wind shaft 85 has a projecting journal portion 86 which has bearing in a thumb screw 87 which threads into cover element 83.

As shown in Fig. 9, a winding spool 90 has a shaft extension 91 which comprises an eccentric which bears in one end of arm 80. The shaft of spool 90 is further extended to provide a bearing pin 92 which bears in a thumb screw (not shown) similar to the thumb screw 87 which receives the journal 86 of the level wind shaft.

A screw 95 threads into cover element 83 and supports a collar 96 for free rotation. Collar 96 has flat sides which fit slidably in a longitudinal slot 97 in arm 80. At its upper end, as viewed in Figs. 8 and 9, driving arm 80 is bifurcated and terminates in a pair of inwardly directed driving teeth 98 and 99 which are engageable between the teeth of pinion 81 to drive the same.

As eccentric 91 rotates upon rotation of winding spool 90, driving arm 80 is oscillated about the axis of screw 95 and also is moved longitudinally to and fro, sliding on collar 96. Assuming the rotation of spool 90 to be clockwise as viewed in Fig. 8, each upward movement of arm 80 will occur when it is oscillated to an extreme clockwise position and returned therefrom to mid-position and tooth 98 will accordingly engage pinion 81 and rotate it a small amount in a clockwise direction. Subsequently, as arm 80 moves back down, it will do so while oscillated to an extreme counter-clockwise position and returned therefrom to mid-position, during which tooth 98 is free of pinion 81 and tooth 99 is in engagement therewith, thus producing a further clockwise rotation of pinion 81.

In this manner level wind shaft 85 is positively rotated from spool 90 at a very much reduced rate and by mechanical means which include a minimum of moving parts. It will be noted that, in this embodiment as in that first described, rotation of the level wind shaft always accompanies rotation of the winding spool and is always in the same direction as the rotation of the winding spool.

The further embodiment illustrated in Figs. 10 and 11 will now be described. Here again the difference is entirely in the manner in which rotation of the level wind shaft is produced. Referring to Figs. 10 and 11, a winding spool is designated 101, a level wind shaft 102, an end member 103, and a cover element therefor 104.

In this embodiment level wind shaft 102 is provided with a ratchet wheel 106 for rotating the level wind shaft in a clockwise direction as viewed in Fig. 10. Retrograde rotation of the level wind shaft is prevented by a locking pawl 108 pivoted to cover element 104 and having a leaf spring 109 for biasing it resiliently toward the ratchet wheel.

In Figs. 10 and 11 the numeral 110 designates a stub shaft which carries a winding crank 111 and is connected to rotate winding spool 101 by suitable conventional gearing designated generally 112. This construction is all conventional excepting that crank shaft 110 carries a cam 113 which, in the form illustrated in Fig. 10, has four successive rises and four intervening relatively abrupt drops.

The numeral 115 designates a longitudinally movable pawl for driving ratchet wheel 106. Pawl 115 may conveniently be offset as shown in Fig. 11 so that it may extend through an opening 116 formed in a bearing plate 117 which is fixed to cover element 104 and forms a conventional part of some reels of this class. The lower end of pawl 115 thus constitutes a follower for cam 113. A leaf spring 120 anchored at one end in cover member 104 engages an offset on pawl 115 to urge the latter against cam 113 and toward pawl 106.

It will be obvious from the foregoing that winding line on the spool 90 by manipulation of hand crank 111 will produce level wind line guiding rotation of shaft 102 by means of the ratchet mechanism described. In this form of the invention, level wind shaft 102 will rotate only when the hand crank 111 is rotating. In reels of this class provision is made for free rotation of the winding spool independently of the hand crank shaft. Such means are conventional and need not be described or illustrated. In the present embodiment when the spool 101 is free-wheeling the level wind shaft 102 does not operate.

As a further alternative, which need not be illustrated, driving pawl 115 may be provided with an eccentric sheave similar to that of arm 80 of Figs. 8 and 9 and have connection with an eccentric on the spool shaft, thus deriving its reciprocation directly from the spool shaft.

What is claimed is:

1. In a fishing reel having a line-winding spool, a rotatable level wind shaft for guiding line alternately from end to end of the spool during line-winding rotation thereof, said level wind shaft having a pair of line guiding depressions formed therein, said depressions being diametrically opposed medially of said shaft and converging adjacent opposite ends thereof, the surfaces of said shaft opposite to said converging depressions being tapered inwardly toward the center of the shaft to guide a line coming in contact therewith when the level wind shaft and the spool have been moved out of timed relation.

2. In a fishing reel having means for winding a fishing line upon the reel, a level wind shaft for guiding the fishing line alternately from end to end of the reel by continuous rotation thereof, said level wind shaft having a pair of flat longitudinal surfaces each forming a generatrix of a helix extending approximately 180° about the shaft, each helix extending rotationwise in a direction opposite to the other helix, said surfaces being diametrically opposed medially of said shaft to form a relatively long, flat, oval cross section of the shaft and each surface merging at opposite ends with the other surface to form convex surfaces facing in opposite directions, said helical surfaces being otherwise separated from each other by arcuate surfaces of the shaft located farther than said flat surfaces from the rotation axis of the shaft, said arcuate surfaces of the shaft being tapered inwardly toward the center of the shaft to guide a line coming in contact therewith when the level wind shaft and said line winding means have been moved out of timed relation, and transmission means for rotating the level wind shaft at a substantially reduced speed relative to said line winding means.

HYLA F. MAYNES.

REFERENCES CITED

The following references are of record in the file of this patent:

UNITED STATES PATENTS

| Number | Name | Date |
| --- | --- | --- |
| 828,969 | Rhodes | Aug. 21, 1906 |
| 1,649,154 | Curdy | Nov. 15, 1927 |
| 1,990,620 | Schweiter | Feb. 12, 1935 |
| 1,995,227 | Rittenhouse | Mar. 19, 1935 |
| 2,181,259 | Balz et al. | Nov. 28, 1939 |
| 2,391,870 | Beach | Jan. 1, 1946 |
| 2,433,304 | Stream | Dec. 23, 1947 |